(12) United States Patent
Takemasa et al.

(10) Patent No.: US 6,630,810 B2
(45) Date of Patent: Oct. 7, 2003

(54) HYBRID VEHICLE AND CONTROL METHOD THEREFOR

(75) Inventors: Koichiro Takemasa, Kawachi-gun (JP); Yutaka Tamagawa, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/314,242

(22) Filed: Dec. 9, 2002

(65) Prior Publication Data
US 2003/0117113 A1 Jun. 26, 2003

(30) Foreign Application Priority Data
Dec. 12, 2001 (JP) .......................... 2001-378802

(51) Int. Cl.[7] .............. H02J 7/00; H02J 7/04; H02G 3/00
(52) U.S. Cl. .................. 320/104; 320/150; 307/10.1
(58) Field of Search ............ 320/104, 150; 307/9.1, 10.1, 11, 28, 43, 48, 75, 112, 116, 125, 87, 139, 141, 141.4; 322/7, 28, 81

(56) References Cited

U.S. PATENT DOCUMENTS 6,459,170 B1 * 10/2002 Tamai et al. .......... 320/104

6,534,950 B2 * 3/2003 LeBoe .................. 320/104

FOREIGN PATENT DOCUMENTS

JP 07079505 * 3/1995

* cited by examiner

Primary Examiner—Edward H. Tso
Assistant Examiner—Pia Tibbits
(74) Attorney, Agent, or Firm—Armstrong, Westerman & Hattori, LLP

(57) ABSTRACT

A hybrid vehicle and a control method of the hybrid vehicle is provided, capable of suppressing discharge of the battery at the time of starting a DC/DC converter and suppressing temporal voltage drop of the battery. When the engine is in the idle state and the power generated by the motor is not sufficient, the motor controller starts the DC/DC converter at a low output voltage state, and the amount of power generated by the motor is gradually increased at a speed without disturbing the idle rotation of the engine, and when it is determined that the power generation by the motor is sufficiently high by comparing the amount of power generation with the amount of power consumption at the output of the DC/DC converter, the operation mode of the output variable DC/DC converter is switched from the low voltage mode to the high voltage mode.

9 Claims, 6 Drawing Sheets

HYBRID VEHICLE AND CONTROL METHOD THEREFOR

BACKGROUND OF THE INVENTION

1. Field of the Invention

The present invention relates to a hybrid vehicle comprising a vehicle driving engine, and a motor, which can drive the engine or generate electric power. In particular, the present invention relates to a hybrid vehicle comprising a control device for controlling a DC/DC converter, used for supplying electric power to auxiliary machines of the vehicle in response to energy generated by the motor.

2. Description of the Related Art

Conventionally, various vehicles such as an EV (Electric Vehicle) or an HEV (Hybrid Electric Vehicle) acquire electric energy by rotating a three-phase alternating current motor for generating the three phase alternating current electric power by use of an inverter deriving the electric energy from a high voltage main battery (electric power storage cell). In, addition, vehicles are provided with a DC/DC converter for converting a high voltage (for example, 144V) of the main battery to 12V for supplying electric power to a control computer actuated by 12V or auxiliary machines (such as the cooling fan, air conditioner, fuel pump and so on), and an auxiliary battery for storing an electric power obtained by converting by a DC/DC converter.

However, in the above-described conventional vehicles, the DC/DC converter is always operated deriving energy from the main battery in order to actuate the auxiliary machines, and a problem arises in that the energy of the main battery cannot always be sufficiently utilized for rotating the motor for driving. In order to solve such a problem, a control device has been proposed in Japanese Unexamined Patent Application, First Publication No. Hei 7-79505. This control device comprises a vehicle travel detect signal generating device for generating a vehicle travel detect signal while the vehicle travels (vehicle is driving) and when the vehicle travels, the control device sets the output voltage of the DC/DC converter at a lower voltage (a voltage that cannot charge the auxiliary battery) which is lower than the output voltage at the time of vehicle stop. Consequently, a part of the electric power supplied to the DC/DC converter at the vehicle stop can be used for rotating the motor during the vehicle travels.

However, since the conventional control device merely distributes the electric power of the main battery, the conventional control device cannot cope with the output voltage drop of the battery caused by the rush current flowing in the auxiliary machines at the time of starting the DC/DC converter.

The above effect will be explained with reference to FIG. 6. As shown by line b in FIG. 6, for example, when the DC/DC converter is actuated, the output current of the DC/DC converter is rapidly increased due to the rush current to the auxiliary machines, as shown by line d in FIG. 6. The internal resistance of the main battery is normally in a range of 0.1 to 0.3 Ω, but the resistance increases at a level of 10 Ω when the main battery is placed in a low temperature atmosphere. In addition, when a current flows rapidly in the DC/DC converter when the internal resistance is high, the output voltage of the main battery may cause a large voltage drop, as shown by line e in FIG. 6.

As a result, depending upon the increased internal resistance, the output voltage of the main battery may be reduced to below the lower limit voltage, shown by line e in FIG. 6, of the main battery (power storage cell). Excessive reduction of the output voltage causes an overdischarge of the battery, degradation of the battery, and deterioration of the service life of the battery. The control battery voltage, shown by line c in FIG. 6, represents the voltage applied to the auxiliary battery. As shown by line d in FIG. 6, even when the output current from the DC/DC converter increases rapidly, since the rapid increase is caused by the rush current, the voltage applied to the auxiliary battery increases gradually.

In order to solve the aforementioned problem, a technique to prevent the excessive voltage drop of the main battery has been proposed in the hybrid vehicle comprising a travel driving engine and a motor which drives the engine or which can generate electric energy. The technique to prevent the excessive voltage drop in the hybrid vehicle is carried out such that by using the motor as a motor generator, the discharge from the main battery is reduced to be as low as possible by controlling generation of the motor-generator driven by the engine in response to the input current to the DC/DC converter.

However, the above-described technique encounters a limit. This is, associated with the late response of the secondary air valve used for stabilizing the engine rotation when the engine is in the idle state, even when it is desired to compensate for the electric energy consumed by the DC/DC converter by one time generation by the motor generator, the engine output does not follow the increase of the generation torque of the motor generator, which results in causing the engine encountering stall or rotation fluctuation. When the generation torque of the motor generator is slowly increased so as to meet the late response of the secondary air valve, it will take time to convert the energy generated by the motor generator to the output voltage of the DC/DC converter, and, as a result, insufficient power will be compensated by the discharge of the battery, causing further voltage drop of the main battery.

SUMMARY OF THE INVENTION

The present invention has been made to solve the aforementioned problems, and it is the object of the present invention to provide a hybrid vehicle and a control method therefor which, while maintaining the stabilized idle rotation of the engine, is capable of preventing the temporary voltage drop of the battery by controlling the discharge of the battery at the time of starting the DC/DC converter at low temperatures.

The first aspect of the present invention provides a hybrid vehicle comprising an engine (for example, an engine 7 in the embodiment) for driving the vehicle, and a motor (for example, a motor generator 6 in the embodiment) for driving the engine or for generating electric energy, a battery (for example, a high voltage battery 1 in the embodiment), a DC/DC converter (for example, a output variable DC/DC converter 2 in the embodiment) for supplying energy to the auxiliary machines (for example, a controller computer and auxiliary machines 3 in the embodiment), a temperature detecting device (for example, a temperature sensor 11 in the embodiment), and an output voltage increasing device (for example, motor controllers 8 and 21 in the embodiment), when the temperature of the battery is below a predetermined temperature, the output voltage increasing device sets the output voltage at a predetermined voltage and starting the DC/DC converter, and, after starting the DC/DC converter, and gradual increases the output voltage of the DC/DC converter from the predetermined voltage.

By constituting the hybrid vehicle as described above, when the engine is in the idle state and the electric energy generated by the motor is low, and when the temperature of the battery is below a predetermined temperature, the DC/DC converter is activated at a low output voltage, and the output voltage of the DC/DC converter is increased gradually from the voltage at the time of activation so that the electric power consumed by the DC/DC converter can be increased gradually.

According to the second aspect of the present invention, the hybrid vehicle comprising an engine (for example, an engine 7 in the embodiment) for driving the vehicle and a motor (for example, a motor generator 6 in the embodiment) for driving of the engine or for generating electric power, and a battery (for example, a high voltage battery 1 in the embodiment), which is charged by electric power generated by the motor, a DC/DC converter (for example, a output variable DC/DC converter 2 in the embodiment), capable of outputting a variable output voltage, and outputting a control voltage for controlling auxiliary machines of the vehicle by decreasing the voltage of the battery, a temperature detecting device (for example, a temperature sensor 11 in the embodiment) for detecting a temperature of the battery; and an output voltage switching control device (for example, a motor controller 8 and 21 in the embodiment), which activates the DC/DC converter by setting the output voltage of the DC/DC converter at a first voltage when the temperature of the batter is below the predetermined temperature, and which carries out a control operation to switch the output voltage from the first voltage value to a second voltage value, which is higher than the first voltage.

By constituting the hybrid vehicle as described above, when the engine is in the idle state and the electric energy generated by the motor is low, and when the temperature of the battery is below a predetermined temperature, the DC/DC converter is activated at a low output voltage, and then the output voltage of the DC/DC converter is switched to a higher voltage so that the electric power consumed by the DC/DC converter can be increased in a stepwise manner.

According to the third aspect of the present invention, in the above hybrid vehicle, after activating the DC/DC converter, the output voltage increasing device gradually increases the amount of electric power generated by the motor in response to the output response characteristic of the engine, and gradually increases the output voltage of the DC/DC converter in response to the increase amount of electric power generated by the motor.

By constituting the hybrid vehicle as described above, when the engine is in the idle state and the electric energy generated by the motor is low, and when the temperature of the battery is below a predetermined temperature, the DC/DC converter is activated at a low output voltage, and while the amount of electric power generation is increased at a speed which does not disturb the idle rotation of the engine, the output voltage of the DC/DC converter is gradually increased, so that it becomes possible to gradually increase the electric power consumed at the output side of the DC/DC converter by an increasing amount of electric power generated by the motor.

According to the fourth aspect of the present invention, after the DC/DC converter is activated, the output voltage switching control device gradually increases the amount of electric power generated by the motor in response to the output response characteristic of the engine, and switches the output voltage of the DC/DC converter from the first voltage to the second voltage.

By constituting the hybrid vehicle as described above, the DC/DC converter is activated at a low output voltage when the engine is in the idle state and the electric power generated by the motor is low, and the output voltage of the DC/DC converter is switched from a low voltage to a high voltage while the output voltage of the DC/DC converter is increased gradually at a low speed so as not to disturb the idle rotation of the engine; thereby the electric power consumed at the output side of the DC/DC converter can be increased at the state, where the electric power generated by the motor is ensured.

According to the fifth aspect of the present invention, the hybrid vehicle further comprising a electric power comparison device (for example, the high voltage electric power information acquisition portion 14, and the low voltage electric power information acquisition portion 17, and steps S5 to step S7 in the embodiment) for comparing between the electric power generated by the motor and the electric power consumed by the DC/DC converter, and when it is determined by the electric power comparison device that the electric power generated by the motor is equivalent to the electric power consumed by the DC/DC converter, the output voltage switching control device carries out a control operation to switch the output voltage of the DC/DC converter from the first voltage to the second voltage.

By providing the hybrid vehicle as described above, the amount of electric power generated by the motor can be dynamically controlled so as to meet the electric power consumed by the DC/DC converter. It is also possible to increase the electric power to be consumed at the output side of the DC/DC converter by switching the output voltage of the DC/DC converter from the low voltage at the time of start to a higher voltage while the electric power generated by the motor is sufficiently preserved.

According to the sixth aspect of the present invention, the hybrid vehicle further comprising a torque comparison device (for example, the high voltage electric power information acquisition portion 14, and the low voltage electric power information acquisition portion 17, the rotation sensor 19, and steps S15 to step S19 in the embodiment) for comparing between the electric power generation torque by the motor and the target electric power torque, and when it is determined by the torque comparison device that the power generation torque by the motor is equivalent to the target power generation torque, the output voltage switching control device carries out a control operation to switch the output voltage of the DC/DC converter from the first voltage to the second voltage.

By constituting the hybrid vehicle as described above, the output voltage of the DC/DC converter can be switched from the low voltage at the time of activation to the higher voltage when it is determined that the electric power obtained by generation of the motor by the comparison between the power generation torque of the motor and the target power generation torque for obtaining electric power consumed by the DC/DC converter, so that it is possible to increase the amount of electric power to be consumed at the output side of the DC/DC converter in the state where the electric power by the motor is sufficiently reserved.

According to the seventh aspect of the present invention, in the above hybrid vehicle, the torque comparison device calculates the target power generation torque from the electric power consumed by loads connected to the DC/DC converter and from a number of rotation of the motor.

By constituting the hybrid vehicle as described above, the torque comparison device is capable of dynamically calculating the target power generation torque in conformity with the change of the electric power consumed at the output side of the DC/DC converter.

The eighth aspect of the present invention provides a method of controlling a hybrid vehicle is provided which comprises an engine (for example, an engine 7 in the embodiment) for driving the vehicle, a motor (for example, a motor generator 6 in the embodiment) for driving the engine or for generating electric power, a battery (for example, a high voltage battery 1 in the embodiment), to be charged by electric power generated by the motor; a DC/DC converter (for example, an output variable DC/DC converter 2 in the embodiment), capable of outputting a variable output voltage, and outputting a control voltage for controlling auxiliary machines of the vehicle (for example, a control computer and auxiliary machines 3 in the embodiment) by depressing the voltage of the battery, and a temperature detecting device (for example, a temperature sensor 11 in the embodiment) for detecting a temperature of the battery, wherein the method of controlling the hybrid vehicle further comprises; a control step for activating the DC/DC motor while setting the output voltage of the DC/DC converter at a predetermined voltage, when the temperature of the battery is below a predetermined temperature, and a control step, after the DC/DC converter has been activated, for gradually increasing the output voltage of the DC/DC converter from the predetermined voltage.

The ninth aspect of the present invention provides a method of controlling a hybrid vehicle comprising an engine (for example, engine 7 in the embodiment) for driving the vehicle, a motor (for example, motor generator 6 in the embodiment) for driving of the engine and for generating electric power, a battery to be charged by electric power generated by the motor; a DC/DC converter, capable of outputting a variable output voltage, and outputting a control voltage for controlling auxiliary machines of the vehicle by depressing the voltage of the battery, and a temperature detecting device for detecting a temperature of the battery, wherein the method of controlling the hybrid vehicle comprises a step for activating the DC/DC motor while setting the output voltage of the DC/DC converter at a first voltage, when the temperature of the battery is below a predetermined temperature, and a step, after the DC/DC converter has been activated, for switching the output voltage of the DC/DC converter from the first voltage to the second voltage which is higher than the first voltage.

DETAILED DESCRIPTION OF THE INVENTION

Hereinafter, the present invention will be explained with reference to the attached drawings.

First Embodiment

Figure 1:
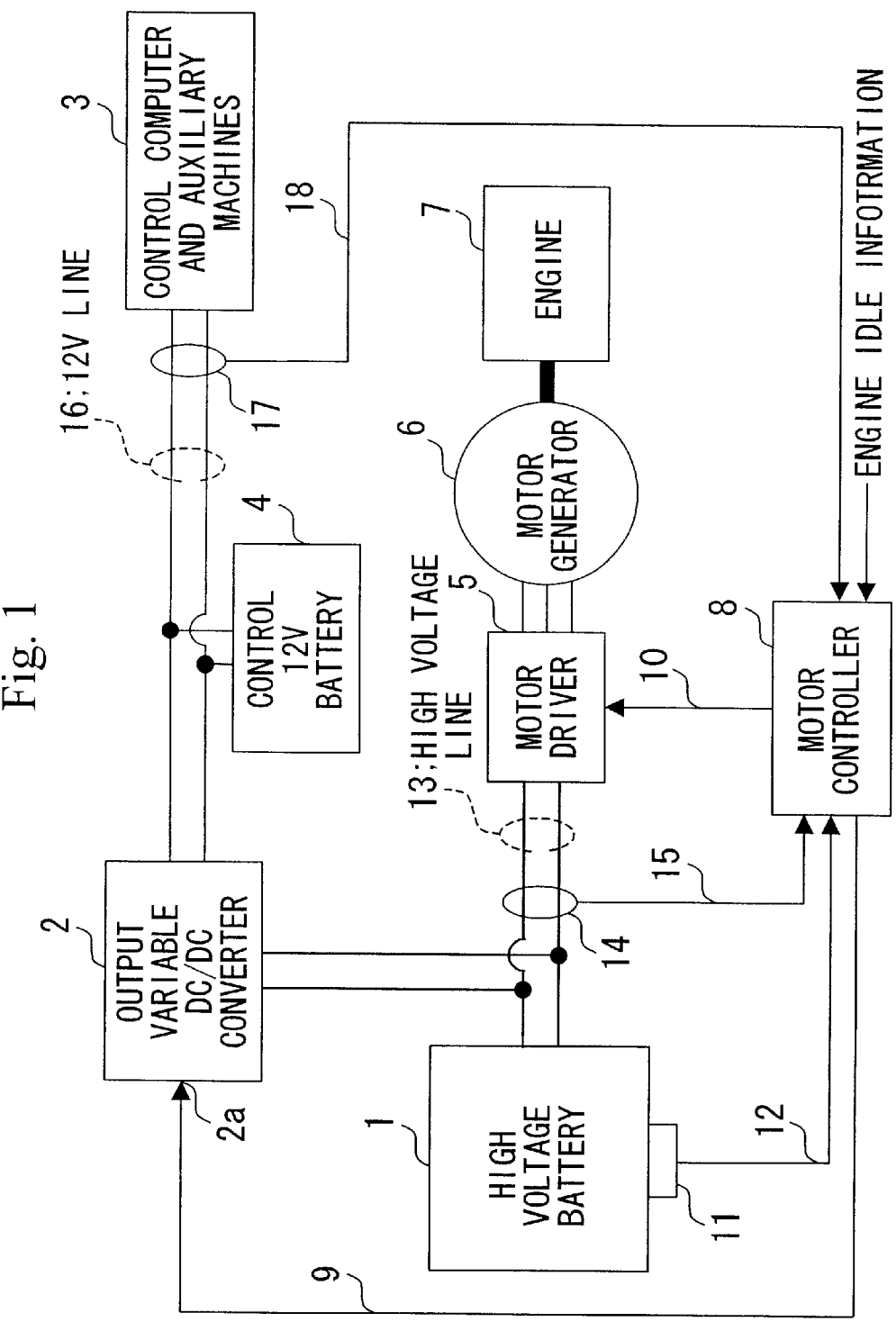
FIG. 1 is a diagram showing the structure of the hybrid vehicle according to the first embodiment of the present invention.

FIG. 1 is a diagram showing the structure of the hybrid vehicle according to the first embodiment of the present invention.

In FIG. 1, the reference numeral 1 denotes a electric power supply (main battery) for the hybrid vehicle of the present invention, which is a high voltage battery having a supply voltage higher than 12V (for example, 144V).

The output variable DC/DC converter 2 is a DC to DC converter for supplying electric power to the controlling computer operated at a power source of 12V and auxiliary machines 3, and is provided with two output control terminals 2a for varying the output voltage. The auxiliary machines connected to the DC/DC converter include a cooling fan, an air conditioner, a fuel pump, etc.

A 12V control battery 4 is connected with the output terminal of the output variable DC/DC converter 2 and the 12V control battery is used for storing the electric power to be supplied to the controlling computer or the auxiliary machines 3, so that the power supply to the controlling computer and the auxiliary machines 3 can be stabilized.

When the control signal being input into, for example, the output control terminal 2a is "HIGH", the DC/DC converter 2 is operated by a high voltage mode, in which the input electric power of the high voltage battery 1 is converted to a voltage of 14.5 V (the second voltage), which is capable of charging the control 12V battery 4. When the control signal being input into the output control terminal 2a is "LOW", the DC/DC converter 2 is operated by a low voltage mode, in which the input electric power of the high voltage battery 1 is converted to a voltage of 12.0 V (the first voltage), which is not capable of charging the control 12V battery 4.

The motor driver 5 is a motor driving inverter, which plays a role in converting the electric power supplied from the high voltage battery 1 to a three phase electric power to be supplied to the motor generator which generates driving power to travel the vehicle.

In addition, the motor generator 6 is mechanically connected to an engine 7, that is, an internal combustion engine, and the motor generator is capable of generating electric power utilizing the rotation of the engine 7 and the generated electric power charges the high voltage battery 1. It is possible to change the amount of power generation or the power generation torque by the motor generator 6 by changing the pulse width in the PWM (Pulse Width Modulation), which is controlled by the motor driver 5.

Note that the motor generator 6 assists the driving force of the engine 7 for traveling the vehicle. However, in other cases, the motor generator 6 and the engine are independently used for driving the vehicle.

The motor controller 8 is a controlling computer, which outputs a control signal to the output variable DC/DC converter 2 and to the motor driver 5 for controlling the motor generator 6, and which is connected to the output control terminal 2a of the output variable DC/DC converter 2 through the control line 9, and is also connected to the motor driver 5 through the control line 10.

In the vicinity of the high voltage battery 1, a temperature sensor 11 is provided for detecting the temperature of the high voltage battery 1. The motor controller 8 obtains temperature information of the high voltage battery 1 through a connection line 12 and outputs control signals based on the temperature of the high voltage battery 1 to the output variable DC/DC converter 2 and to the motor driver 5.

On the other hand, a high voltage electric power information acquisition portion 14 is provided on the high voltage line 13, which connects the high voltage battery 1 and the output variable DC/DC converter or the motor driver 5. The high voltage information acquisition portion 14 detects electric power information which is supplied from the motor driver 5 to the high voltage line at the time of starting the motor generator 6 by means of a current sensor and a voltage sensor and the electric power information obtained by the high voltage information acquisition portion 14 is input into the motor controller 8 through the connection line 15.

Similar to the above, a low voltage electric power information acquisition portion 17 is provided on the 12V line 16, which connects the output variable DC/DC converter 2 and the controlling computer as well as the auxiliary machines 3. The low voltage electric power information acquisition portion 17 detects the electric power consumed in the 12V line 16 (output portion of the output variable DC/DC converter) by means of a current sensor and a voltage sensor and the electric power information obtained by the low voltage electric power information acquisition portion 17 is input into the motor controller 8 through the connection line 18.

Consequently, the motor controller 8 makes a comparison between the electric power consumed in the 12 V line 16 (output portion of the output variable DC/DC converter) and the electric power obtained at the high voltage information acquisition portion 14 for being supplied to the high electric power line 13. A control signal, based on the above comparison operation between the electric power to the output variable DC/DC converter and the electric power to the motor driver generator, is output to the output variable DC/DC converter 2 and the motor driver 5.

Furthermore, engine idle information (not shown in FIG. 1), indicating whether the engine is in the idle state after the engine 7 is started, is input into the motor controller 8. The motor controller 8 determines from the engine idle information whether the engine 7 is in the idle state or in the running state, and a control signal based on the state of the engine 7 is output to the output variable DC/DC converter 2 and the motor driver 5.

Note that, similarly to the electric power source for the controlling computer and auxiliary machines 3, the electric power from the output variable DC/DC converter is supplied to the motor driver 5, motor controller 8, and feed-back control devices 15 as the electric power source.

The operations of the present embodiment are described with reference to the drawings.

Figure 2:
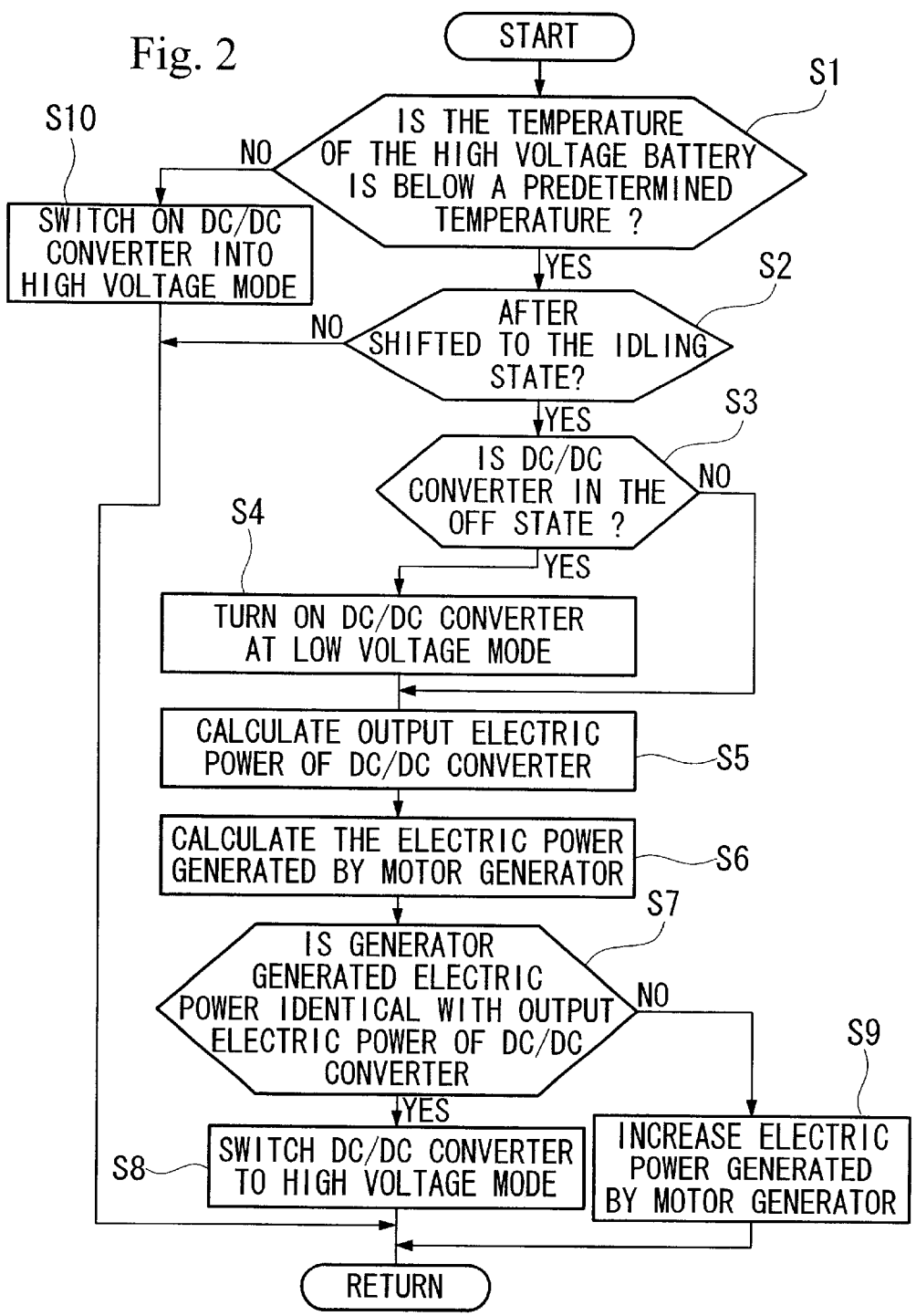
FIG. 2 is a flowchart showing the control operation of the output variable DC/DC converter by the motor controller of the hybrid vehicle according to a first embodiment of the present invention.

FIG. 2 is a flowchart showing the control operations of the output variable DC/DC converter in the motor controller of the hybrid vehicle of the present invention.

In FIG. 2, immediately after starting the engine, the motor controller 8 first determines whether the temperature of the high voltage battery 1 is below a predetermined temperature by making a comparison between the temperature of the high voltage battery 1 with a predetermined lower limit temperature (step S1).

In step S1, when the temperature of the high voltage battery 1 is below the predetermined temperature (YES in step S1), the motor controller 8 subsequently determines whether the engine is shifted to the idling operation (idle state)(step S2), based on the engine idle information, which is output from the engine controller (not shown in FIG. 1).

In step S2, when the engine is shifted to the idling operation (YES in step S2), the motor controller further determines whether the output variable DC/DC converter 2 is in the OFF (stop) state (step S3).

In step S3, when the output variable DC/DC converter 2 is in the OFF state (YES in step S3), the motor controller 8 turns ON (start) the output variable DC/DC converter 2 in the low voltage mode (step S4).

In contrast, when the output variable DC/DC converter 2 is in the ON state (NO in step S3), the motor controller 8 proceeds to the next step S5 without performing an operation.

Subsequently, the motor controller 8 calculates an output electric power of the output variable DC/DC converter 2, based on the electric power information obtained from the low voltage electric power information acquisition portion 17 (step S5).

The motor controller, on the other hand, calculates the electric power generated by the regenerative operation of the motor generator 6, based on the electric power information obtained in the high voltage electric power information acquisition portion 14 (step S6).

Subsequently, it is determined whether the electric power generated by the motor generator 8 is equivalent to the output electric power of the output variable DC/DC converter (step S7).

In step S7, when the electric power of the motor generator 6 is equivalent with the output power of the output variable DC/DC converter 2 (YES in step S7), the motor controller 8 switches the output variable DC/DC converter to the high voltage mode (step S8), and after the flow returns to step S1, the control operation of the output variable DC/DC converter 2 is carried out continuously.

In contrast, when it is determined in step S7 that the electric power of the motor generator 6 is not equivalent with the output power of the output variable DC/DC converter 2 (NO in step S7), since the amount of electric power by the motor generator 6, the motor controller 8 increases the amount of electric power generated by the motor generator 6 (step, S9), and after the flow returns to step S1, the control operation of the output variable DC/DC converter 2 is carried out continuously.

Note that when it is determined in step S1 that the temperature of the high voltage battery higher than the predetermined temperature (NO in Step S1), the motor controller 8 turns the output variable DC/DC converter 2 to the ON (activated) state (step S1 ).

In addition when it is determined in Step S2 that the engine is before shifting to the idling state (NO in step S2), the motor controller 8 does not change the operational state of the output variable DC/DC converter and after the flow returns to step S1, the control operation of the output variable DC/DC converter is carried out continuously.

As described above, in the hybrid vehicle according to the present embodiment, when the amount of generated energy of the motor generator 6 is low because the engine 7 is in the idling state, and the temperature of the high voltage battery 1 is below the predetermined temperature, the motor controller 8 activates the output variable DC/DC converter in a low voltage mode and increases the amount of power generation gradually at a speed so as not to affect the idle rotation of the engine 7. Furthermore, the amount of electric power generated of the motor generator 6 is compared with the amount of the power consumed by components at the output side of the output variable DC/DC converter 2, and when it is determined that the amount of power generation exceeds the amount of the power to be consumed, the operating mode of the output variable DC/DC converter is switched from the low voltage mode to the high voltage mode.

As described above, the control method of the present invention yields an effect, of preventing, without generating excess electric power, the sudden voltage rise of the output power of the output variable DC/DC converter due to the rush current to the load connected to the output variable DC/DC converter and also of preventing a sudden voltage drop of the high voltage battery which supplies electric power to the DC/DC converter, by forming a simple control system, in which the amount of electric power generated by the motor generator 6 is controlled dynamically in accordance with the change of the power consumption of the output of output variable DC/DC converter, and in the state where sufficient electric power is ensured by the motor generator 6, the electric power consumed at the output side is increased by switching the output voltage of the output variable DC/DC converter 2 while compensating for insufficient electric power by the motor generator with stable operation of the engine.

Note that, in the present embodiment, the motor controller 8 includes the electric power comparison device of the hybrid vehicle. Concretely, steps S5 to S7 corresponds to the electric power comparison device.

Second Embodiment

The second embodiment of the present invention is described below with reference to the attached drawings.

Figure 3:
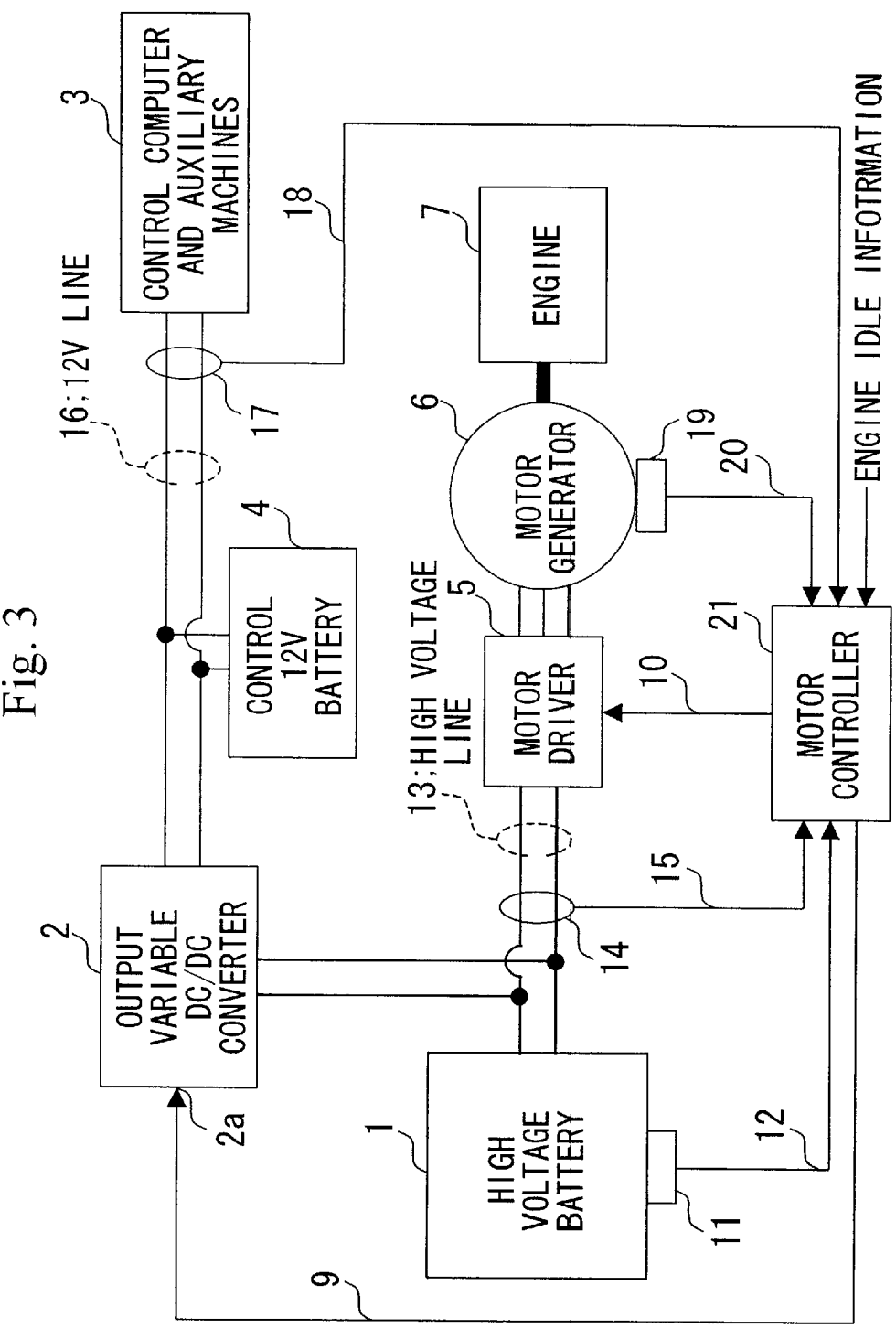
FIG. 3 is a diagram showing the structure of the hybrid vehicle according to the second embodiment of the present invention.

FIG. 3 is a block diagram showing the structure of the hybrid vehicle according to the second embodiment of the present invention.

In FIG. 3, the hybrid vehicle of the second embodiment which differs from the hybrid vehicle of the first embodiment in that motor generator 8 provided with the hybrid vehicle of the first embodiment further is modified such that the motor generator 8 comprises a rotation sensor 19 for detecting the rotation rate of the motor generator 8 and that the motor controller 21 is modified to output a control signal to the motor generator 8 based on rotation rate information of the motor generator 8. In FIG. 3, the constituting elements having the same reference numbers as those in FIG. 1 are the same elements. Therefore their explanations are omitted.

Next, the operation of the present embodiment is described below with reference to the attached drawings.

Figure 4:
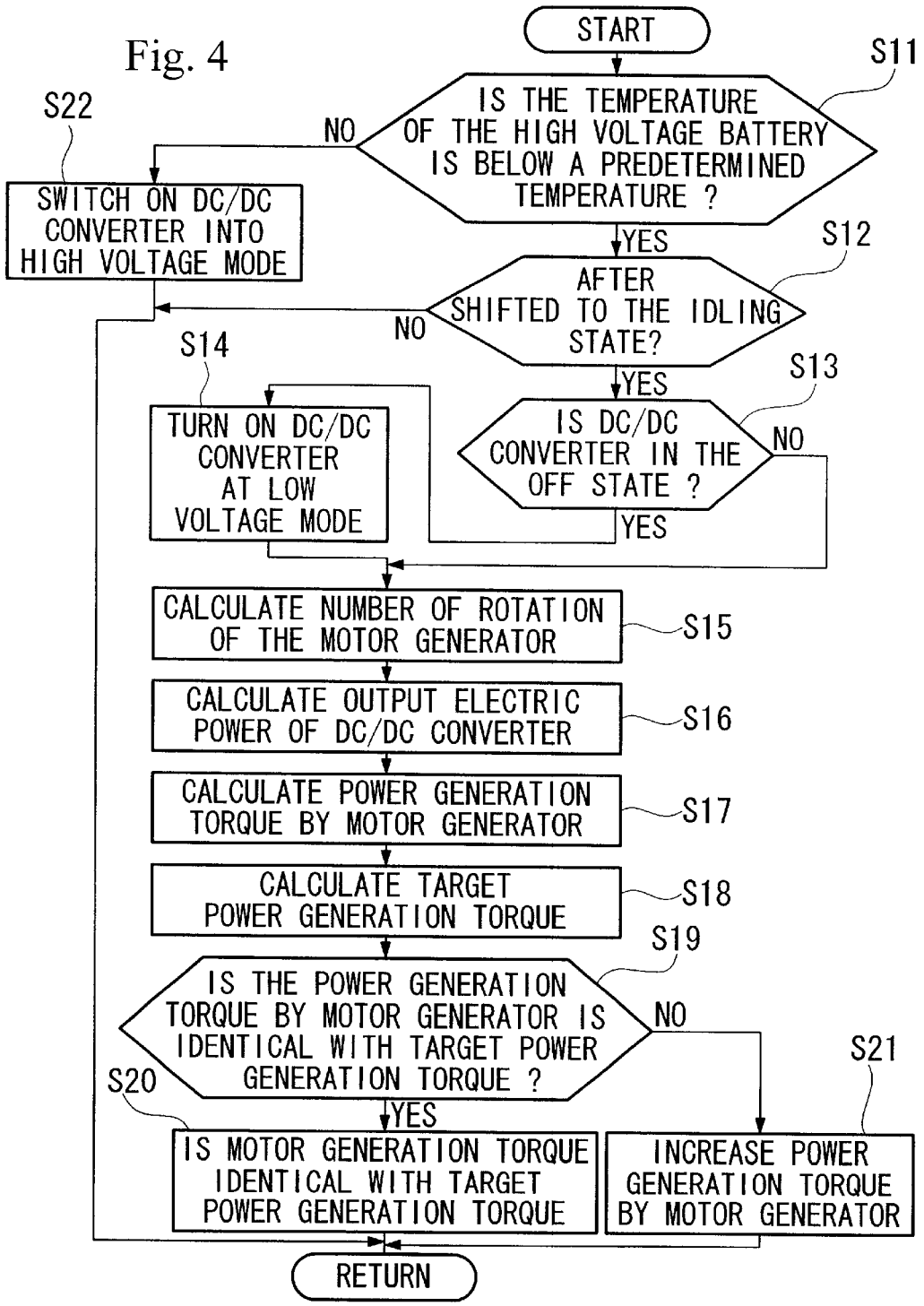
FIG. 4 is a flowchart showing the control operation of the output variable DC/DC converter by the motor controller of the hybrid vehicle according to the second embodiment of the present invention.

FIG. 4 is a flowchart showing the control operation of the output variable DC/DC converter of the hybrid vehicle according to the second embodiment.

In FIG. 4, after the engine 7 is started, the motor controller 21 first compares the temperature of the high voltage battery 1 obtained by the temperature sensor 11 with the predetermined lower limit temperature and determines whether the temperature is a predetermined temperature (step S11).

When it is determined in step S11 that the temperature of the high voltage battery 1 is below the predetermined temperature (YES in step S11), then the flow proceeds to step S12, wherein it is determined whether the engine 7 is already shifted to the idling state (in the idle state).

When it is determined in step S12 that the engine is in the idle state (YES in step S12), the flow proceeds to step S13, wherein the motor controller 21 determines whether the output variable DC/DC converter 2 is in OFF state (stopping).

When the output variable DC/DC converter 2 is in OFF state (YES in step S13), the flow proceed to step S14, wherein the motor controller 21 turns the output variable DC/DC converter 2 to the ON state (start) at the low voltage mode.

In contrast, when it is determined in step S13 that the output variable DC/DC converter 2 is in the ON state (NO in step S13), the flow proceeds to step S15 without doing anything.

Next, in step S15, the motor controller 21 calculates the number of rotation of the motor generator 6 based on rotation rate information obtained by the rotation sensor 19.

The flow proceeds to step S16, wherein the motor controller 21 calculates the output electric power of the output variable DC/DC converter based on electric power information obtained by the low voltage electric power information acquisition portion 17.

The flow further proceeds to step S17, wherein the motor controller 21 calculates a power generation torque by regeneration operation of the motor generator based on electric power information acquired by the high voltage electric power information acquisition portion 14 and the number of rotation of the motor generator 6.

The flow proceeds to step S18, wherein the motor controller 21 calculates a target power generation torque in the motor generator 6 for acquiring the electric power to be consumed in the 12V line (the output of the output variable DC/DC converter), based on the output electric power of the output variable DC/DC converter 2 and the rate of rotation of the motor generator 6.

Subsequently, in step S19, a comparison between the power generation torque of the motor generator 6 and the target power generation torque for obtaining the output power of the output variable DC/DC converter 2 is made for determining whether both values are identical.

In step S19, when it is determined that the power generation torque by the motor generator 6 and the target generation torque is identical (YES in step S19), the motor controller switches the output variable DC/DC converter 2 to the high voltage mode (step S20), and the flow returns to step S11, and the control operation of the output variable DC/DC converter 2 is carried out continuously.

In contrast, when it is determined that the power generation torque by the motor generator 6 and the target power generation torque is not identical (NO in step S19), the flow proceeds to step S21, wherein the motor controller determines that the power generation torque is not sufficient and the motor controller 21 increases the amount of power generated by the motor generator 6 (in step S21). The flow then returns to step S11, and the control operation of the output variable DC/DC converter 2 is carried out continuously.

It is noted when it is determined in the above-described step S11 that the temperature of the high voltage battery is higher than the predetermined temperature (NO in step S11), the flow proceeds to step S22, wherein the motor controller 21 turns ON (activates) the output variable DC/DC converter 2 at the high voltage mode.

In step S 12, when the engine is before being shifted to the idle state (NO in step S12), the flow returns to step S11 while the motor controller maintains the state of the output variable DC/DC converter 2 as it is, and the control operation of the output variable DC/DC converter 2 is carried out continuously.

As described above, according to the present embodiment, the hybrid vehicle activates the output variable DC/DC converter at the low voltage mode, when the amount of power generated by the motor generator 6 is low and the temperature of the high voltage battery 1 is below the predetermined temperature because the engine 7 is in the idle mode, and gradually increases the amount of power generation at a speed which does not affect on the idle rotation of the engine 7. In addition, the operation mode of the output variable DC/DC converter 2 is switched from the low voltage mode to the high voltage mode, when it is determined that the power generation torque becomes equivalent to the target generation torque by comparing the amount of power generation with the consumed amount of output power of the output variable DC/DC converter 2.

The power generation torque of the motor generator 6 is controlled dynamically so as to be equivalent to the target power generation torque, which is calculated from the consumed amount of the output power of the output variable DC/DC converter 2, and at the same time, the power consumed at the output side of the output variable DC/DC converter 2 is increased by switching the output voltage of the output variable DC/DC converter 2 when it is determined that the amount of power generation by the motor generator 6 becomes ensured, and it is further determined accurately that the amount of power generation, is sufficiently secured while the engine 7 is operating while compensating for the insufficient electric power. The control device of the hybrid vehicle according to the present embodiment carried out the control procedure as described above by a simple constitution of switching the output voltage of the output variable DC/DC.converter. That is, the control method of the present invention has a prominent effect that it is capable of preventing the excessive voltage drop of the high voltage battery, used for supplying electric power to the output variable DC/DC converter, by restraining rapid increase of the output voltage of the DC/DC converter 2 due to the rush current into the load, which is connected to the DC/DC converter.

Note that the controller of the present embodiment includes the torque comparison device for the hybrid vehicle. Concretely, the steps S15 to S19 shown in FIG. 4 correspond to the comparison device.

Next, the results of the control operations of the output variable DC/DC converter according to the first or the second embodiments are described below with reference to the attached drawings.

Figure 5:
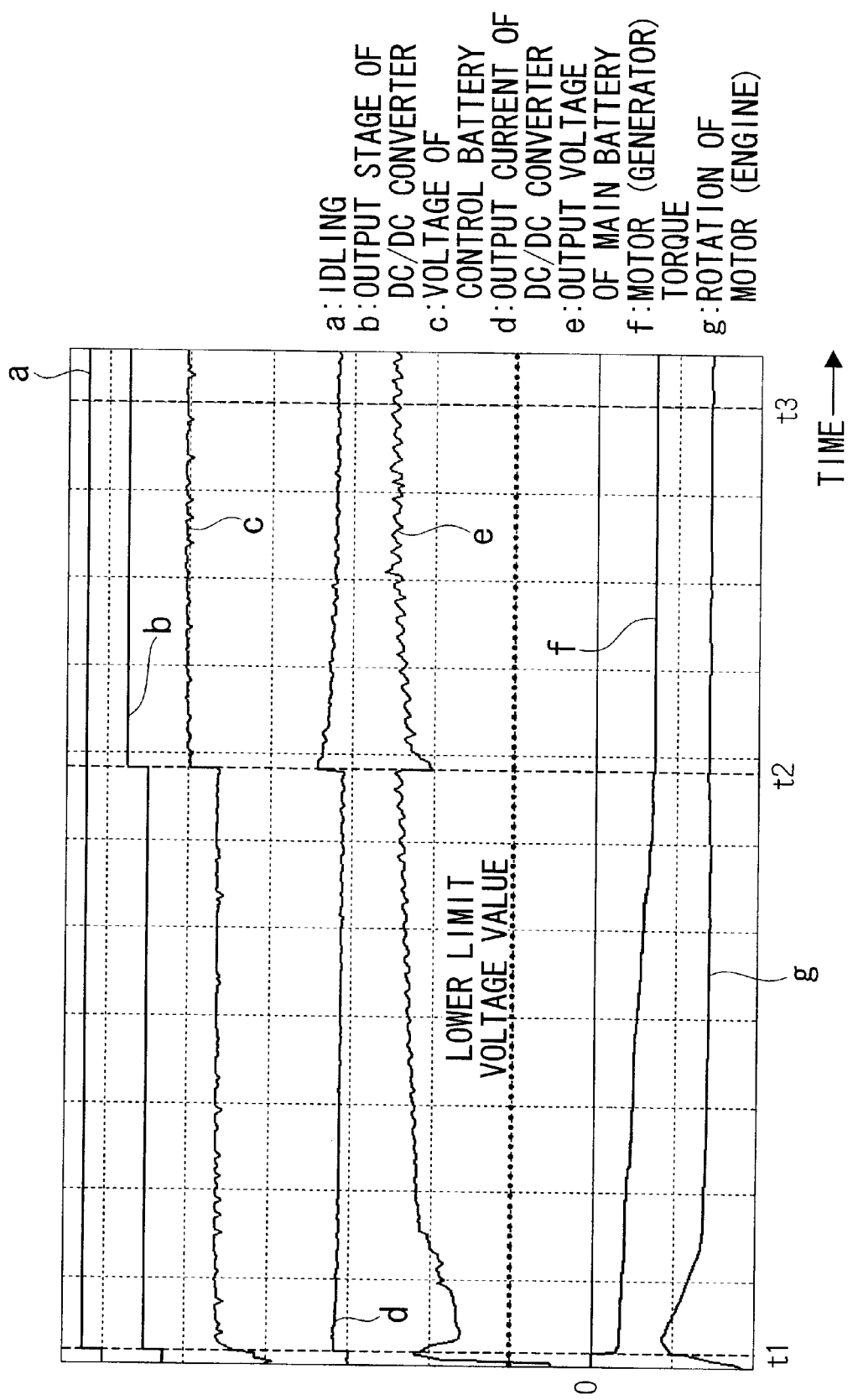
FIG. 5 is a waveform diagram showing the result of the control operation of the output variable DC/DC converter in the hybrid vehicles according to the first and second embodiments of the present invention.
Figure 6:
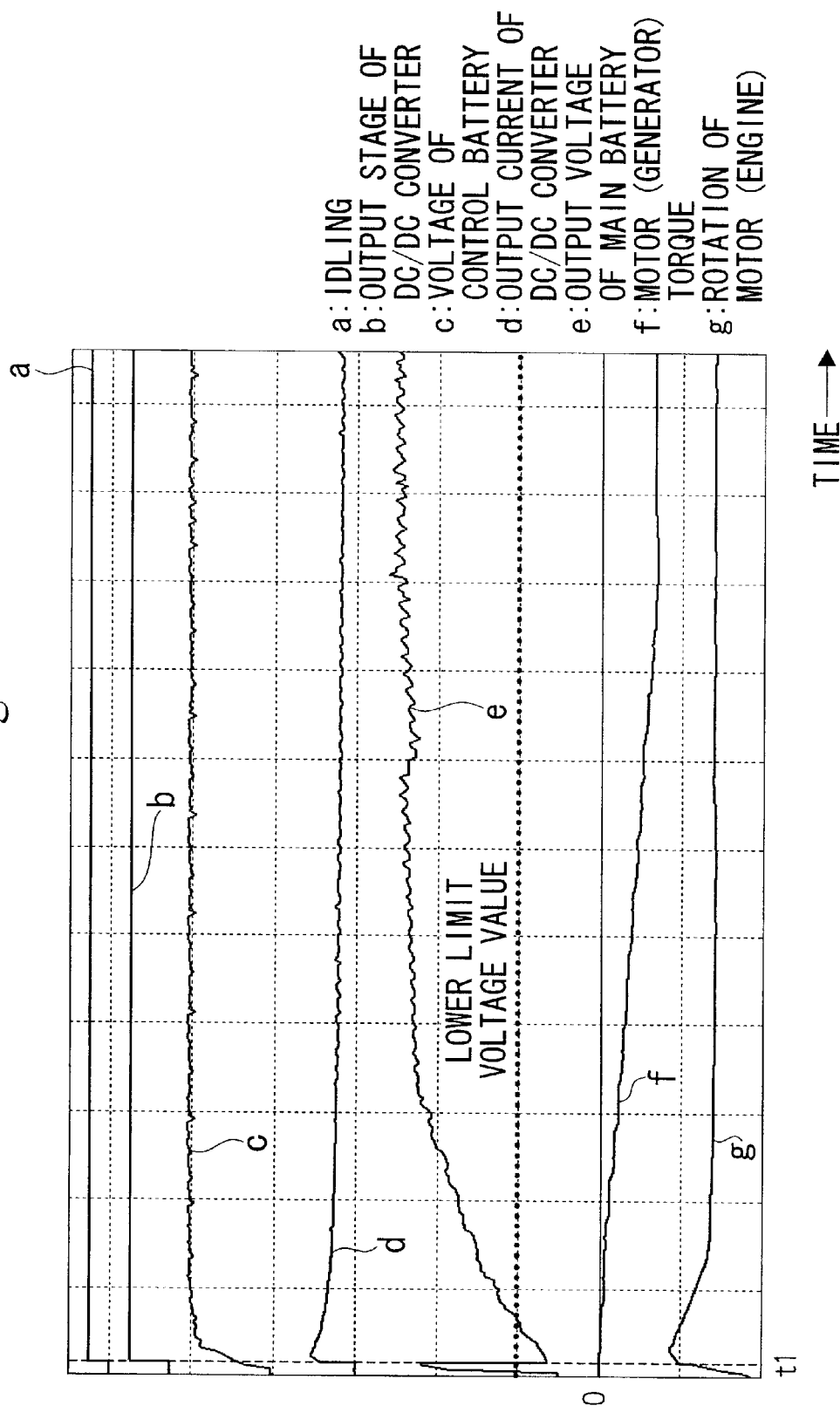
FIG. 6 is a waveform diagram in the conventional hybrid vehicles.

FIG. 5 is a diagram showing the time dependent change of the control results of the output variable DC/DC converter in the hybrid vehicle according to the first and second embodiment. Line a in FIG. 5 shows that the vehicle has been in the idle state when the output variable DC/DC converter is actuated at time t1. Line b in FIG. 5 shows that the output variable DC/DC converter is actuated at time t1. Line c in FIG. 5 shows a voltage applied to the control 12V battery 4, which indicates, as shown by line d in FIG. 5, that, even if the output current of the output variable DC/DC converter rapidly starts to flow, the output voltage of the output variable DC/DC converter is activated at a low voltage mode.

At this time, as shown by line f in FIG. 5, since the power generation torque of the motor generator is limited to a half level of the stationary state level by the control operation of the motor controller 8 or the motor controller 21, conforming with activation of the output variable DC/DC converter, even if the output current of the output variable DC/DC converter starts to flow, the output power consumption of the output variable DC/DC converter does not increases. As a result, as shown by line e in FIG. 5 as the output voltage of the main battery, only a small voltage drop is observed in the output voltage of the high voltage battery.

Furthermore, at time t2, as shown by line b in FIG. 5, the output voltage of the output variable DC/DC converter 2 is turned to the high voltage mode and the voltage applied to the control 12V battery increases. As shown by line f in FIG. 5, even if the output current of the output variable DC/DC converter 2 increases, the power generation torque of the motor generator, as shown by line f in FIG. 5, is in a stationary state and since the amount of power generation is sufficiently secured, only a small voltage drop is observed as the output voltage of the high voltage battery 1, shown as the output voltage of the main battery by line e in FIG. 5.

Note that, in the aforementioned first and second embodiments, when the temperature of the main battery, after the engine is started, is below the predetermined temperature, the output variable DC/DC converter 2 is activated at the output voltage of, for example, 2.0 V (first voltage), which is not possible to charge the control 12V battery 4. However, the control methods of the first and second embodiment of the present invention switch the output voltage of the output variable DC/DC converter 2 to a high voltage 14. 5 V (second voltage), which is capable of charging the control 12V battery, when it is determined that the motor generator is capable of supplying sufficient electric power, through a comparison between the amount of electric power supplied to the high voltage line 13 and the electric power consumed in the 12V line 16 (output of the output variable DC/DC converter 2), or through a comparison between the power generation torque for generating electric power to be supplied to the high voltage line 13 and the target power generation torque for obtaining electric power consumed at 12 av line 16 (output of the output variable DC/DC converter 2).

In addition, the output voltage of the output variable DC/DC converter 2 is not only increased stepwise as shown above, but also the output of the output variable DC/DC converter 2 can be increased in a stepless manner gradually and continuously based on the temperature of the high voltage battery, a result of comparison between electric power supplied the high voltage line 13 with electric power supplied to the 12V line 16.

The present invention exhibits effects in that it is possible not only to prevent the extreme voltage drop of the high voltage battery 1, which supplies electric power to the output variable DC/DC converter 2, but also to prevent the output variable DC/DC converter 2 from generating magnetic noise due to the rapid change of the output of the output variable DC/DC converter 2.

The effects of the present invention can be summarized as follows.

According to the first aspect of the present invention, a hybrid vehicle is provided comprising an engine (for example, an engine 7 in the embodiment) for driving the vehicle, and a motor (for example, a motor generator 6 in the embodiment) for driving the engine or for generating electric energy, a battery (for example, a high voltage battery 1 in the embodiment), a DC/DC converter (for example, a output variable DC/DC converter 2 in the embodiment) for supplying energy to the auxiliary machines (for example, a controller computer and auxiliary machines 3 in the embodiment), a temperature detecting device (for example, a temperature sensor 11 in the embodiment), and an output voltage increasing device (for example, motor controllers 8 and 21 in the embodiment), when the temperature of the battery is below a predetermined temperature, the output voltage increasing device sets the output voltage at a predetermined voltage and starting the DC/DC converter, and, after starting the DC/DC converter, and gradual increases the output voltage of the DC/DC converter from the predetermined voltage.

By the constitution of the above hybrid vehicle, when the engine is in the idle state and the electric energy generated by the motor is low, and when the temperature of the battery is below a predetermined temperature, the DC/DC converter is activated at a low output voltage, and the output voltage of the DC/DC converter is increased gradually from the voltage at the time of activation so that the electric power consumed by the DC/DC converter can be increased gradually.

According to the second aspect of the present invention, the hybrid vehicle comprising an engine (for example, an engine 7 in the embodiment) for driving the vehicle and a motor (for example, a motor generator 6 in the embodiment) for driving of the engine or for generating electric power, and a battery (for example, a high voltage battery 1 in the embodiment), which is charged by electric power generated by the motor, a DC/DC converter (for example, a output variable DC/DC converter 2 in the embodiment), capable of outputting a variable output voltage, and outputting a control voltage for controlling auxiliary machines of the vehicle by decreasing the voltage of the battery, a temperature detecting device (for example, a temperature sensor 11 in the embodiment) for detecting a temperature of the battery; and an output voltage switching control device (for example, a motor controller 8 and 21 in the embodiment), which activates the DC/DC converter by setting the output voltage of the DC/DC converter at a first voltage when the temperature of the batter is below the predetermined temperature, and which carries out a control operation to switch the output voltage from the first voltage value to a second voltage value, which is higher than the first voltage.

By the constitution of the above hybrid vehicle, when the engine is in the idle state and the electric energy generated by the motor is low, and when the temperature of the battery is below a predetermined temperature, the DC/DC converter is activated at a low output voltage, and then the output voltage of the DC/DC converter is switched to a higher voltage so that the electric power consumed by the DC/DC converter can be increased in a stepwise manner.

According to the third aspect of the present invention, in the above hybrid vehicle, after activating the DC/DC converter, the output voltage increasing device gradually increases the amount of electric power generated by the motor in response to the output response characteristic of the engine, and gradually increases the output voltage of the DC/DC converter in response to the increase amount of electric power generated by the motor.

By the constitution of the above hybrid vehicle, when the engine is in the idle state and the electric energy generated by the motor is low, and when the temperature of the battery is below a predetermined temperature, the DC/DC converter is activated at a low output voltage, and while the amount of electric power generation is increased at a speed which does not disturb the idle rotation of the engine, the output voltage of the DC/DC converter is gradually increased, so that it becomes possible to gradually increase the electric power consumed at the output side of the DC/DC converter by an increasing amount of electric power generated by the motor.

According to the fourth aspect of the present invention, after the DC/DC converter is activated, the output voltage switching control device gradually increases the amount of electric power generated by the motor in response to the output response characteristic of the engine, and switches the output voltage of the DC/DC converter from the first voltage to the second voltage.

By the constitution of the above hybrid vehicle, the DC/DC converter is activated at a low output voltage when the engine is in the idle state and the electric power generated by the motor is low, and the output voltage of the DC/DC converter is switched from a low voltage to a high voltage while the output voltage of the DC/DC converter is increased gradually at a low speed so as not to disturb the idle rotation of the engine; thereby the electric power consumed at the output side of the DC/DC converter can be increased at the state, where the electric power generated by the motor is ensured.

According to the fifth aspect of the present invention, the hybrid vehicle further comprising a electric power comparison device (for example, the high voltage electric power information acquisition portion 14, and the low voltage electric power information acquisition portion 17, and steps S5 to step S7 in the embodiment) for comparing between the electric power generated by the motor and the electric power consumed by the DC/DC converter, and when it is determined by the electric power comparison device that the electric power generated by the motor is equivalent to the electric power consumed by the DC/DC converter, the output voltage switching control device carries out a control operation to switch the output voltage of the DC/DC converter from the first voltage to the second voltage.

By the constitution of the above hybrid vehicle, the amount of electric power generated by the motor can be dynamically controlled so as to meet the electric power consumed by the DC/DC converter. It is also possible to increase the electric power to be consumed at the output side of the DC/DC converter by switching the output voltage of the DC/DC converter from the low voltage at the time of start to a higher voltage while the electric power generated by the motor is sufficiently preserved.

According to the sixth aspect of the present invention, the hybrid vehicle further comprising a torque comparison device (for example, the high voltage electric power information acquisition portion 14, and the low voltage electric power information acquisition portion 17, the rotation sensor 19, and steps S15 to step S19 in the embodiment) for comparing between the electric power generation torque by the motor and the target electric power torque, and when it is determined by the torque comparison device that the power generation torque by the motor is equivalent to the target power generation torque, the output voltage switching control device carries out a control operation to switch the output voltage of the DC/DC converter from the first voltage to the second voltage.

By the constitution of the above hybrid vehicle, the output voltage of the DC/DC converter can be switched from the low voltage at the time of activation to the higher voltage when it is determined that the electric power obtained by generation of the motor by the comparison between the power generation torque of the motor and the target power generation torque for obtaining electric power consumed by the DC/DC converter, so that it is possible to increase the amount of electric power to be consumed at the output side of the DC/DC converter in the state where the electric power by the motor is sufficiently reserved.

What is claimed is:

1. A hybrid vehicle comprising an engine for driving the vehicle and a motor for assist driving the engine and for generating electric power, further comprises:

a battery, which is charged by electric power generated by said motor;

a DC/DC converter, capable of outputting a variable output voltage, and which outputs a control voltage for controlling auxiliary machines of the vehicle by decreasing the voltage of the battery;

a temperature detecting device for detecting a temperature of the battery; and an output voltage increasing device which activates said DC/DC converter by setting the output voltage of the DC/DC converter at a predetermined value when the temperature of the battery is below a predetermined value, and which increases the output voltage gradually from said predetermined value after said DC/DC converter is activated.

2. A hybrid vehicle comprising an engine for driving the vehicle and a motor for assist driving of the engine and for generating electric power, further comprises:

a battery, which is charged by electric power generated by said motor;

a DC/DC converter, capable of outputting a variable output voltage, and which outputs a control voltage for controlling auxiliary machines of the vehicle by decreasing the voltage of the battery;

a temperature detecting device for detecting a temperature of the battery; and an output voltage switching control device, which activates said DC/DC converter by setting the output voltage of said DC/DC converter at a first voltage when the temperature of said batter is below the predetermined temperature , and which carries out a control operation to switch the output voltage from said first voltage value to a second voltage value, which is higher than the first voltage.

3. A hybrid vehicle according to claim 1, wherein, after activating said DC /DC converter, said output voltage increasing device gradually increases the amount of electric power generated by the motor in response to the output response characteristic of the engine, and gradually increases the output voltage of the DC/DC converter in response to the increase of the amount of electric power generated by the motor.

4. A hybrid vehicle according to claim 2, wherein, after said DC/DC converter is activated, said output voltage switching control device gradually increases the amount of electric power generated by said motor in response to the output response characteristic of said engine, and switches the output voltage of said DC/DC converter from said first voltage to said second voltage.

5. A hybrid vehicle according to claim 2, wherein said hybrid vehicle further comprising a electric power comparison device for comparing between said electric power generated by said motor and the electric power consumed by said DC/DC converter, and when it is determined by said electric power comparison device that said electric power generated by the motor is equivalent to said electric power consumed by said DC/DC converter, said output voltage switching control device carries out a control operation to switch the output voltage of said DC/DC converter from said first voltage to said second voltage.

6. A hybrid vehicle according to claim 2, wherein said hybrid vehicle further comprising a torque comparison device for comparing between said electric power generation torque by said motor and the target electric power torque, and when it is determined by said torque comparison device that said power generation torque by the motor is equivalent to said target power generation torque, said output voltage switching control device carries out a control operation to switch the output voltage of said DC/DC converter from said first voltage to said second voltage.

7. A hybrid vehicle according to claim 6, wherein said torque comparison device calculates the target power generation torque from said electric power consumed by loads connected to the DC/DC converter and from a rate of rotation of said motor.

8. A method of controlling a hybrid vehicle comprising an engine for driving the vehicle, a motor for assist driving of the engine and for generating electric power, a battery, to be charged by electric power generated by said motor; a DC/DC converter, capable of outputting a variable output voltage, and outputting a control voltage for controlling auxiliary machines of the vehicle by depressing the voltage of the battery, and a temperature detecting device for detecting a temperature of the battery, wherein said method of controlling the hybrid vehicle further comprises:

a control step for activating said DC/DC motor while setting the output voltage of said DC/DC converter at a predetermined voltage, when the temperature of the battery is below a predetermined temperature, and, a control step, after said DC/DC converter has been activated, for gradually increasing the output voltage of said DC/DC converter from said predetermined, voltage.

9. A method of controlling a hybrid vehicle comprising an engine for driving the vehicle, a motor for assist driving of the engine and for generating electric power, a battery to be charged by electric power generated by said motor; a DC/DC converter, capable of outputting a variable output voltage, and outputting a control voltage for controlling auxiliary machines of the vehicle by depressing the voltage of the battery, and a temperature detecting device for detecting a temperature of the battery, wherein said method of controlling the hybrid vehicle comprises:

a control step for activating said DC/DC motor while setting the output voltage of said DC/DC converter at a first voltage, when the temperature of the battery is below a predetermined temperature, and a control step, after said DC/DC converter has been activated, for gradually increasing the output voltage of said DC/DC converter from said first voltage to a second voltage which is higher than the first voltage.

* * * * *